(12) United States Patent
Morimoto et al.

(10) Patent No.: US 7,442,662 B2
(45) Date of Patent: Oct. 28, 2008

(54) HIGH-HEAT CONDUCTIVE SI-CONTAINING MATERIAL AND ITS MANUFACTURING METHOD

(75) Inventors: Kenji Morimoto, Kasugai (JP); Shinji Kawasaki, Nagoya (JP); Hiroaki Sakai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/412,796

(22) Filed: Apr. 28, 2006

(65) Prior Publication Data

US 2006/0194689 A1  Aug. 31, 2006

Related U.S. Application Data

(62) Division of application No. 10/498,807, filed as application No. PCT/JP02/13273 on Dec. 19, 2002, now abandoned.

(30) Foreign Application Priority Data

| Dec. 21, 2001 | (JP) | ............................. 2001-389459 |
| Jan. 25, 2002 | (JP) | ............................. 2002-017373 |

(51) Int. Cl.
    *C04B 35/577* (2006.01)
(52) U.S. Cl. .................... 501/88; 264/671; 264/672; 264/673; 264/682
(58) Field of Classification Search ............. 501/88–92; 264/29.1, 671–673, 682
See application file for complete search history.

(56) References Cited

U.S. PATENT DOCUMENTS

| 4,299,631 A | 11/1981 | Kennedy et al. |
| 4,970,057 A * | 11/1990 | Willkens et al. ............. 423/344 |
| 5,179,049 A * | 1/1993 | Numata et al. ................ 501/88 |
| 5,432,253 A | 7/1995 | Singh ........................... 501/92 |
| 5,589,116 A | 12/1996 | Kojima et al. ................ 264/628 |
| 5,846,460 A | 12/1998 | Matsuura et al. .............. 264/43 |
| 6,036,932 A | 3/2000 | Hongu et al. ................ 423/348 |
| 6,387,834 B1 | 5/2002 | Odaka et al. .................. 501/88 |
| 6,695,984 B1 | 2/2004 | Odaka et al. ................. 252/504 |
| 6,699,401 B1 * | 3/2004 | Horiuchi et al. ............. 216/108 |
| 6,699,411 B2 | 3/2004 | Odaka et al. ................ 264/29.7 |
| 6,737,168 B1 * | 5/2004 | Yamagata et al. ........... 428/446 |
| 7,011,803 B2 | 3/2006 | Ichikawsa et al. |
| 2003/0151152 A1 * | 8/2003 | Nichelson et al. .......... 264/29.1 |

FOREIGN PATENT DOCUMENTS

| EP | 0519644 | 12/1992 |
| JP | 55-109273 | 8/1980 |
| JP | 60-131862 | 7/1985 |
| JP | 60-221380 | * 11/1985 |
| JP | 05-017227 | 1/1993 |
| JP | 06-345412 | 12/1994 |
| JP | 10-291857 | 11/1998 |
| JP | 11-214680 | 8/1999 |
| WO | 01-07377 | 2/2001 |
| WO | WO 01/79138 A | 10/2001 |

OTHER PUBLICATIONS

Derwent Abstract, Japanese document 60131862 A, Jul. 13, 1985.
Derwent Abstract, Japanese document 10291857, Nov. 4, 1998.
Derwent Abstract, Japanese document 55109273, Aug. 22, 1980.
The Japan Institute of Metals, Kinzoku Data Book, revised 2$^{nd}$ edition, Maruzen Co., Ltd., Jan. 30, 1984 (p. 43).

* cited by examiner

*Primary Examiner*—Karl E Group
(74) *Attorney, Agent, or Firm*—Burr & Brown

(57) ABSTRACT

A highly heat-conductive Si-containing material containing a Si phase whose lattice constant at room temperature is controlled at a level of more than 0.54302 nm but 0.54311 nm or less. Firing is conducted using a kiln material containing no B compound. With this highly heat-conductive Si-containing material and the process for production thereof, a reduction in heat conductivity can be prevented and a high heat conductivity can be exhibited stably.

4 Claims, No Drawings

HIGH-HEAT CONDUCTIVE SI-CONTAINING MATERIAL AND ITS MANUFACTURING METHOD

REFERENCE TO RELATED APPLICATIONS

This application is a divisional of application Ser. No. 10/498,807 filed Jun. 15, 2004, now abandoned.

TECHNICAL FIELD

The present invention relates to a highly heat-conductive Si-containing material and a process for producing the material.

BACKGROUND ART

Since Si-containing materials (porous or dense) containing Si as a Si phase such as, for example, silicon-silicon carbide composite materials containing Si and SiC as main phases or materials containing silicon carbide as a main phase have a high strength and moreover are superior in heat resistance, oxidation resistance and heat conductivity, they are currently in use in various applications such as kiln tool, jig for heat treatment, honeycomb filter and the like.

At the time of the above-mentioned Si-containing material, there has been mainly used a kiln tool made of a dense SiC material to which BN, $B_4C$ and C have been added in an amount of 1% as a superaddition, or of a carbon having been coated with BN as a reaction-preventive layer.

However, Si-containing materials produced using the above kiln tool have had a problem that the actual heat conductivity is far smaller than the designed heat conductivity.

The present invention has been made in view of the above-mentioned problem of the prior art and aims at providing a highly heat-conductive Si-containing material in which, by controlling the lattice constant of the Si phase at room temperature, a reduction in heat conductivity can be prevented and a high heat conductivity can be exhibited stably, and a process for producing such a Si-containing material.

DISCLOSURE OF THE INVENTION

According to the present invention, there is provided a highly heat-conductive Si-containing material characterized by containing a Si phase whose lattice constant at room temperature is controlled at a level of more than 0.54302 nm but 0.54311 nm or less.

Here, the boron content in the Si phase is preferably 0.02% by weight or less.

In the present invention, the Si-containing material is preferably either of a silicon-silicon carbide type material, a silicon-silicon carbide type composite material, a material composed mainly of silicon carbide, and a material composed mainly of silicon.

According to the present invention, there is also provided a process for producing a highly heat-conductive Si-containing material, characterized by conducting firing using a kiln material containing no B compound.

Here, the kiln material is preferably alumina or an oxide-bonded silicon carbide material.

BEST MODE FOR CARRYING OUT THE INVENTION

As described above, the Si-containing material of the present invention contains a Si phase whose lattice constant at room temperature is controlled at a level of more than 0.54302 nm but 0.54311 nm or less.

By doing so, it becomes possible to prevent a reduction in heat conductivity and exhibit a high heat conductivity stably.

In the present Si-containing material, the boron content in the Si phase is preferably 0.02% by weight or less in order to control the lattice constant of the Si phase at the above-mentioned level.

The reason therefor is that in the heat conduction in Si, phonon is considered to have a central role and, when the boron content in the Si phase exceeds 0.02% by weight, the B (boron) is present in the Si phase in the form of a solid solution and thereby the lattice vibration of Si shows anharmonicity, presumably resulting in a reduction in heat conductivity.

Thus, the main characteristic of the present Si-containing material lies in that by focussing on the heat conductivity reduction of a Si-containing material, caused by the lattice constant reduction of the Si phase contained therein which occurs when B (boron) is present in the Si phase in a solid solution form, the boron content in the Si phase in the present Si-containing material has been optimized so that the present Si-containing material can contain a Si phase whose lattice constant at room temperature is controlled at a level of more than 0.54302 nm but 0.54311 nm or less.

In the present invention, it is also preferred that the Si-containing material is either of a silicon-silicon carbide type material, a silicon-silicon carbide type composite material, a material composed mainly of silicon carbide, and a material composed mainly of silicon.

Here, the silicon-silicon carbide type material (Si-SiC type material) contains various different phases ranging from a silicon phase consisting of unreacted state silicon to a substantially pure silicon carbide; typically consists of a silicon phase and a silicon carbide phase, wherein the silicon carbide phase may be a plurality of SiC phases in which the Si contents are gradually changed.

Therefore, the silicon-silicon carbide type material is a general term for Si-SiC series materials wherein the carbon contents vary from 0 mol % to 50 mol %.

The silicon-silicon carbide type composite material (Si-SiC type composite material) is, for example, a material obtained by impregnating a C/C composite with Si and is a material having a yarn assembly wherein a number of yarns (each containing at least a carbon fiber bundle and a carbon component other than the carbon fiber) are combined three-dimensionally with being orientated in the layer direction and are integrated so that they are not separated from each other, and a matrix made of a Si-SiC type material, which is filled in the yarn assembly between the adjacent yarns.

The material composed mainly of silicon carbide includes, for example, a silicon carbide material impregnated with silicon, and a silicon carbide material coated with silicon.

Next, description is made on the process for producing the Si-containing material of the present invention.

The main characteristic of the present production process lies in that a Si-containing material (for example, a silicon-silicon carbide type material, a silicon-silicon carbide type composite material or a material composed mainly of silicon carbide) is fired using a kiln material containing no boron compound (e.g. NB or the like).

Thereby, contact of the Si-containing material with B (boron) can be prevented; as a result, there can be prevented the reduction in heat conductivity of the Si-containing material due to the reduction in lattice constant caused by the presence of B (boron) in a solid solution form.

Incidentally, the kiln material is preferably alumina or an oxide-bonded silicon carbide material (a material obtained by adding, to SiC, a clay or the like as a binder and firing and solidifying the mixture).

The present invention is described below in more detail by way of Examples. However, the present invention is in no way restricted to these Examples.

EXAMPLES 1 to 2 AND COMPARATIVE EXAMPLES 1 to 5

Silicon (lattice constant: 0.54311 nm, heat conductivity: 133 W/mK) was fired in an Ar atmosphere at 1,145° C. for 2 hours using a sagger and a setter both shown in Table 1, whereby were produced melt-solidified samples (Si-alone samples) of Examples 1 to 2 and Comparative Examples 1 to 5.

The samples were measured for lattice constant, heat conductivity and boron content in Si phase. The results are shown in Table 1.

Incidentally, lattice constant was calculated from a diffraction profile obtained by X-ray diffractometry at room temperature, by the WPPD method.

Boron content in Si phase was determined by conducting a solution treatment to extract silicon alone and then conducting an ICP emission spectral analysis, and heat conductivity was measured by a laser flash method at room temperature.

TABLE 1

| | Kiln tool | Lattice constant (nm) | Heat conductivity (W/mK) | Boron content in Si phase (wt. %) |
| --- | --- | --- | --- | --- |
| Ex. 1 | Alumina sagger, alumina setter | 0.54310 | 116 | <0.005 |
| Ex. 2 | Carbon sagger, alumina setter | 0.54309 | 117 | 0.005 |
| Comp. Ex. 1 | BN sagger, BN setter | 0.54396 | 74 | 0.040 |
| Comp. Ex. 2 | Alumina sagger, BN setter | 0.54291 | 72 | 0.040 |
| Comp. Ex. 3 | Carbon sagger, BN setter | 0.54293 | 66 | 0.044 |
| Comp. Ex. 4 | BN sagger, alumina setter | 0.54298 | 90 | 0.025 |
| Comp. Ex. 5 | SiC* sagger, alumina setter | 0.54302 | 92 | 0.021 |

*A SiC dense material to which $B_4C$ and C have been added as a sintering aid each in an amount of 1% as a superaddition.

In Examples 1 and 2, it was found that when B (boron) is removed from the atmosphere employed during firing (melting), the product obtained can be allowed to have a lattice constant of more than 0.54302 nm and a heat conductivity of 100 W/mK or more (a lattice constant of more than 0.54305 nm and a heat conductivity of 110 W/mK or more).

Incidentally, heat conductivity can be calculated from the above lattice constant using the first regression formula [lattice constant=$3.14 \times 10^{-6}$ heat conductivity+0.54271] of the data of Table 1 and silicon before melting and solidification (lattice constant: 0.54311 nm, heat conductivity: 133 W/mK).

Meanwhile, Comparative Examples 1 to 3 are cases each using a setter made of BN. In these cases, Si reacted directly with BN and it is considered that there was dissolution during melting, via the solid-liquid interface; as a result, each product obtained had a lattice constant of 0.5296 nm or less and a heat conductivity of 80 W/mK or less.

Comparative Examples 4 to 5 are cases each using a sagger made of BN. In these cases, Si was not in direct contact with BN and it is considered that during the melting of Si, the B (boron) vapor generated from decomposition of BN dissolved in Si via the gas (B)-liquid (Si) interface; as a result, each product obtained had a lattice constant of 0.54302 or less and a heat conductivity of less than 100 W/mK.

EXAMPLES 3 TO 4 AND COMPARATIVE EXAMPLE 6

Based on the results of the above-produced melt-solidified samples (Si-alone samples), there were produced Si-SiC type materials (porosity: 0%) of Examples 3 to 4 and Comparative Example 6, by firing dense Si-SiC type material precursors in an Ar atmosphere at 1,450° C. for 2 hours, using a sagger and a setter both shown in Table 2.

Each sample obtained was measured for lattice constant, heat conductivity and boron content in Si phase. The results are shown in Table 2.

TABLE 2

| | Kiln tool | Lattice constant (nm) | Heat conductivity (W/mK) | Boron content in Si phase (wt. %) |
| --- | --- | --- | --- | --- |
| Ex. 3 | Alumina sagger, Si—SiC type setter | 0.54308 | 174 | <0.005 |
| Ex. 4 | Oxide-bonded silicon carbide* sagger, Si—SiC type setter | 0.54303 | 171 | 0.011 |
| Comp. Ex. 6 | BN-coated carbon sagger, Si—SiC type setter | 0.54295 | 162 | 0.040 |

*A material obtained by adding, to SiC, a clay or the like as a binder and sintering and solidifying the mixture.

In Examples 3 to 4, as compared with Comparative Example 6, heat conductivities of 170 W/mK or more could be obtained.

INDUSTRIAL APPLICABILITY

In the highly heat-conductive Si-containing material and process for production thereof, of the present invention, the lattice constant of Si phase at room temperature is controlled, whereby a reduction in heat conductivity can be prevented and a high heat conductivity can be exhibited stably.

The invention claimed is:

1. A process for producing a highly heat-conductive Si-containing material, comprising:
   controlling a Si phase so that its lattice constant at room temperature is at a level of more than 0.54302 nm but equal to or less than 0.54311 nm,
   by firing a silicon-silicon carbide composite material in an Ar atmosphere in a kiln using a kiln tool containing no B compound, wherein the firing temperature is approximately 1450° C.

2. The process of claim 1, wherein the kiln tool is one of an alumina material and an oxide-bonded silicon carbide material.

3. The process of claim 1, wherein a boron content in the Si phase of the highly heat-conductive Si-containing material is 0.02% by weight or less.

4. A process for producing a highly heat-conductive Si-containing material, comprising:
  controlling a Si phase so that its lattice constant at room temperature is at a level of more than 0.54302 nm but equal to or less than 0.54311 nm,
  by firing a silicon-silicon carbide composite material in an Ar atmosphere in a kiln using a kiln tool containing no B compound, wherein the firing temperature is approximately 1450° C, so that said highly heat-conductive Si-containing material has a heat conductivity of 100 W/mK or more.

* * * * *